FLOATING MARK DATA TRANSFER SYSTEM
Filed June 13, 1960
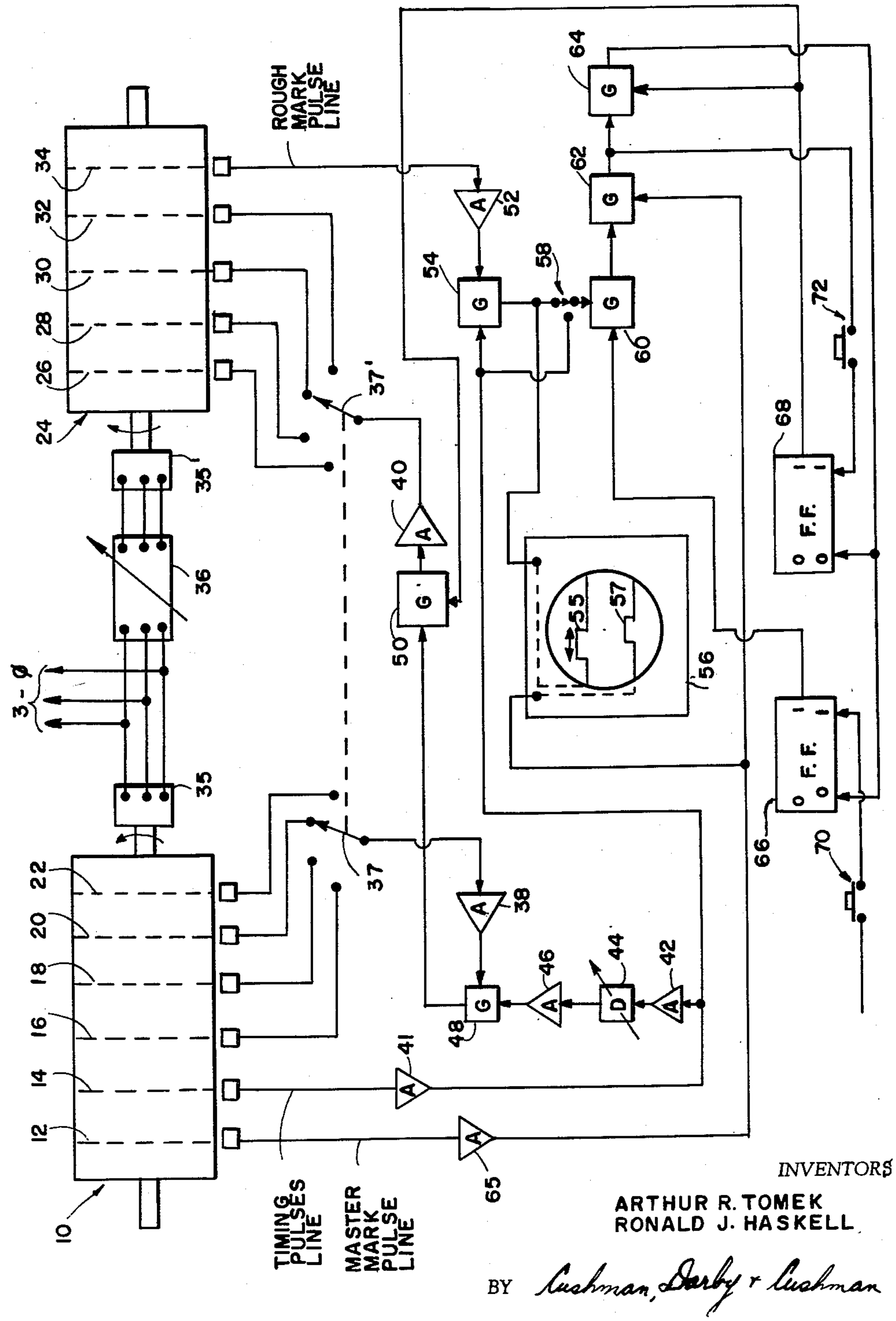
INVENTORS
ARTHUR R. TOMEK
RONALD J. HASKELL
BY Cushman, Darby & Cushman
ATTORNEYS United States Patent Office 3,118,135

Patented Jan. 14, 1964

3,118,135
FLOATING MARK DATA TRANSFER SYSTEM

Arthur R. Tomek, St. Paul, and Ronald J. Haskell, Minneapolis, Minn., assignors to Sperry Rand Corporation, New York, N.Y., a corporation of Delaware Filed June 13, 1960, Ser. No. 35,750
9 Claims. (Cl. 340—174.1)

This invention relates to data storage systems and, more particularly, to a "floating" mark data transfer system.

In data storage system, data is stored in memory units, where it is available for later use. These units, in a cyclic type of storage system, may take the form, for example, of rotating drums or the like, having a plurality of memory tracks. It often becomes necessary to assemble prerecorded data stored on one or more cyclic memory units and relocate the data in some desired manner on a new unit. When such is the case, the transferred data must be stored on the cyclic unit in synchronism with respect to the position of the read-out means associated with each recorded memory track, so that read-out from any of the tracks will begin with essentially the same time lag as the read-out from any other of the tracks of the unit and so that read-out will not begin in the middle of the recorded data.

One previous method for installing data on a rotating drum involves transfer from a reference drum which is mechanically coupled to the recipient drum. This method is unsatisfactory because a mechanical oscillation due to torsional effects in the coupling produces either expansion or compression of the data being transferred. Using this method, it is very difficult to record data with less than the maximum phase error of 0.2 microsecond required by most specifications. This method also requires that the drums be operated with the covers off which results in a cooler than normal shroud condition. The normal signal amplification is difficult to ascertain and some additional phase shift occurs due to variation of the air gap between the read-out head and the drum surface upon return to the normal operating temperature. A further disadvantage is that the method is limited to drums which lend themselves to mechanical coupling.

A second method is to record the data by individually writing pulses selected from a coincidence counter. The chief disadvantage of this method is that it is laborious and time consuming, particularly if the data is complex. For example, two 8-hour days are normally required to install a multitude of complex data on a digital drum by this method.

Briefly described, the present invention employs, in one embodiment, a pair of drums having an electrical drive means such that the relative rotational speed of the drums is variable, a mark pulse on one drum having proper time relation to the prerecorded signals on that drum, a rough mark located anywhere on a circumferential track of the second drum, an indicating means such as a dual trace oscilloscope for determining the time of coincidence as the rough mark trace "floats" into alignment with the mark trace as the relative speed of the two drums is varied, and circuit means for producing at that time a coincidence pulse which allows the prerecorded data to be transferred to the second drum during one revolution between two successive occurrences of the coincidence pulses. This apparatus allows master data to be transferred in two hours rather than the two days required by prior art arrangements, and in addition, provides very accurate synchronism between all tracks of transferred data.

An object of the present invention, therefore, is to provide a method and means for recording data on a cyclic storage medium faster and more accurately than possible with previous means.

Another object of the invention is to provide means for accurately transferring prerecorded data from one reference drum to a second drum even though the two drums may differ somewhat in rotational speed.

Still another object of the present invention is to provide means for accomplishing the above-stated objects wherein the data is transferred in only one revolution of the second drum and is in proper synchronism with other transferred data.

A further object of the invention is to provide apparatus including a reference drum having prerecorded data and a mark pulse which has a fixed position with respect to the prerecorded data stored thereon, a second drum having a rough mark pulse located anywhere on the periphery of the drum, drive means for varying the relative rotational speed of the drums, and circuit means for first indicating the time of coincidence as the rough mark pulse "floats" into alignment with the mark pulse and producing, at that time, a coincidence pulse as the relative rotational speed of the drums is varied, and secondly, for reading out the reference drum data and transferring it to the second drum in the period of one revolution between two successive occurrences of the coincidence pulse whereby the newly recorded data is accurately located with respect to other transferred data and is transferred in only one drum revolution.

Still other objects of this invention will become apparent to those of ordinary skill in the art by reference to the following detailed description of the exemplary embodiment of the apparatus and method of operating same along with the appended claims. The various features of the exemplary embodiment according to the invention may be best understood with reference to the accompanying drawing wherein:

The single figure shows exemplary data transfer apparatus and circuitry in block diagram form.

With reference to the drawing, the specific apparatus employed by the invention will be described. A reference or master drum 10 has a number of memory tracks represented by dashed lines 12, 14, 16, 18, 20 and 22. Track 12 contains a single mark pulse while track 14 contains a series of regularly occurring timing pulses. Tracks 16, 18, 20 and 22 contain prerecorded signals representing data. The number of memory tracks employed herein is merely exemplary, as there could be a greater or lesser number depending on the size of the drums. A second or recipient drum 24 has a number of memory tracks represented by dashed lines 26, 28, 30, 32 and 34. Track 34 contains a single rough mark pulse placed at any position on the periphery of track 34 by any suitable means, not shown. Each of the memory tracks on both of drums 10 and 24 has a read-record transducer or head properly associated therewith in a manner well known in the art.

Both of drums 10 and 24 are suitably mounted and provided with an electrical drive means 35, 35', respectively, for rotating the drums in the same direction, as indicated by the arrows. Drive means 35 is directly coupled to a three-phase power source, while drive means 35' is coupled thereto through a variable system 36 comprising, for example, three ganged variacs. This arrangement could be reversed, if desired, so as to provide a variable drive to drum 10 rather than to drum 24 as shown.

A switching means is arranged so that ganged switch arms 37—37' thereof connect the output of a selected one of the reading heads associated with permanent data tracks 16, 18, 20 and 22 of reference drum 10 as the input to a first amplifier 38 and simultaneously connect the output of a second amplifier 40 to a selected one of the writing heads associated with memory tracks 26, 28, 30 and 32 of recipient drum 24. The reading head associated with timing track 14 has its output connected as the input to a third amplifier 41. The output of amplifier 41 is connected as the input to a fourth amplifier 42 whose output is in turn connected as the input to a fifth amplifier 46 through a suitable variable delay means 44. A first gate 48 receives as one input the output of the amplifier 46 and as a second input the output of the amplifier 38. The output of gate 48 is connected as one input to a second gate 50 whose output is connected as the input to the amplifier 40.

The reading head associated with the rough mark track 34 has its output connected as the input to a sixth amplifier 52 whose output is in turn connected as one input to a third gate 54. Gate 54 also receives as a second input the output of amplifier 41. The output of gate 54 is connected both as a first input to a dual trace oscilloscope 56 and, through one position of a S.P.D.T. transfer switch 58, as one input to a fourth gate 60. In the second position of switch 58, the output of gate 54 is returned to the input thereof, placing the timing track amplifier 41 output on the first input to the scope. The output of gate 60 is connected as one input to a fifth gate 62 whose output is connected as one input to a sixth gate 64. The reading head associated with the master mark track 12 has its output connected as the input to a seventh amplifier 65 whose output is in turn connected both as a second input to scope 56 and as a second input to gate 62.

Provided in the transfer control circuitry are a pair of bistable or flip-flop circuits 66, 68 each of which has two inputs and two outputs, with only one output being used. Flip-flops 66, 68 are normally in one of their possible states and produce their respective useful output when in the other of their possible states. These said one and other states, for greater clarity, will be referred to as the 0 and 1 states, respectively. One of the inputs to each flip-flop is a set-to-1 input while the other input to each flip-flop is a set-to-0 input. An input is supplied, from a source not shown, to the set-to-1 input to flip-flop 66 through a momentary contact start switch 70. The output of gate 64 is applied to the set-to-0 inputs of both flip-flops 66, 68, while output of gate 62 is applied to the set-to-1 input of only flip-flop 68 through a momentary contact write switch 72. The 1 state output of flip-flop 66 is connected as a second input to gate 60 while the 1 state output of flip-flop 68 is applied as a second input to both of gates 50 and 64.

The amplifiers and flip-flops of this apparatus are preferably formed respectively, by one of the well-known transistorized circuits; additionally, amplifier 40 is, in the preferred embodiment, one of the return-to-zero types of amplifiers.

The operation of the apparatus is as follows: Data pulses read-out from track 20 of the master drum 10, with switch arm 37 in the position shown, are amplified at 38 and applied as enabling pulses to gate 48. Regularly occurring pulses readback from timing track 14 are amplified, shaped and appropriately delayed in amplifiers 41, 42, 46 and delay means 44 and used to probe gate 48. The delay caused by means 44 is adjusted, if need be, to cause the timing pulses to arrive at gate 48 coincident with respective data signals thereto from amplifier 38. The resulting pattern of coincidence pulses from gate 48 represent the data to be transferred and are continuously applied as probes to gate 50 which is disabled except during the time of writing. The above setting of the variable delay means 44 is then used for all data to be transferred from the master drum 10.

The signal readback from the rough mark track 34 of drum 24 occurs once for each drum revolution and is amplified at 52 and applied as an enable input to gate 54. Upon coincidence of one of the timing track pulses and the enabling pulse from amplifier 52, gate 54 produces an output which is applied to the second input of oscilloscope 56, and with the transfer switch 58 in the position shown, is also applied to an input of gate 60.

The dual trace oscilloscope 56 permits the display of both the master mark pulse from amplifier 65 and the output pulse from gate 54 on the same screen. By adjusting the relative speed of the two drums by means of the speed control system 36, the gate 54 output pulse trace 55, which is effectively the rough mark pulse trace, appears to move relative to the master track pulse trace 57.

When the start switch 70 is closed, flip-flop 66 is set to its 1 state producing an output which enables gate 60, thereby passing the output pulse from gate 54 when present, to the input of gate 62. Upon coincidence of the input pulse from gate 60, which is effectively the rough mark pulse, and the master mark pulse from amplifier 65, gate 62 produces a coincidence output pulse which is employed to initiate the data transfer operation. To obtain this coincidence, the operator adjusts the speed control 36 until the pulse trace 55 representing the rough mark pulse is almost aligned on the scope with the master mark pulse trace 57. This is observed with a sweep period somewhat longer than the period of one drum revolution. It is noted, therefore, that a scope having a delayed sweep is required. The sweep is then expanded to approximately 5 microseconds per centimeter when coincidence appears imminent and the drift or "float" rate is not excessive. In this respect, the drift rate should be slow enough to allow gate 62 to produce at least two, and desirably more than two, successive coincidence pulses before the alignment of the two scope traces is lost.

At the point of imminent coincidence of pulses 55 and 57, the operator depresses the write switch 72 and holds same until at least one coincidence pulse is produced by gate 62. The first resultant coincidence pulse from gate 62 after the switch 72 is operated sets flip-flop 68 to its 1 state producing an output which has two effects. First, gate 50 is enabled, and hence, the data from gate 48 which has been continuously probing gate 50 is passed to amplifier 40 and is recorded on a selected track 30 of recipient drum 24 with the switch arm 37′ in the position shown. Secondly, the 1 state output from flip-flop 68 enables gate 64. It should be noted that due to the inherent delay in flip-flop 68, gate 64 is not enabled until after the said first coincidence pulse has passed through gate 62. As a result, the next coincidence pulse from gate 62 due to the continued coincidence of the master mark pulse with effectively the rough mark pulse marks the end of one revolution and passes through gate 64 to reset both flip-flops 66, 68 to their 0 state. The gates 50, 60 and 64 are therefore disabled after essentially one drum revolution, allowing for the above drift rate, and one track of data has been transferred to the second drum. The above procedure may be repeated for each track of data which is to be transferred.

Since the writing of any data from a track on the master drum onto a track on the second drum begins only on the effective coincidence of both the master and rough mark pulses, it can be seen that the transferred data will have accurate synchronism between each track, with the only error in synchronism being due to differing drift or "float" rates of the mark traces achieving coincidence. Even this error can be eliminated, if desired, by reducing the drift rate to zero. This would be accomplished by the operator, before operating the write switch 72, adjusting the speed control to bring the two traces appearing on the scope into alignment and then readjusting the speed control until the two drums have the same rotational speed while maintaining said alignment. With the system set in this fashion, a zero drift rate appears on the scope and all of the data contained on the master drum could be transferred quite rapidly by setting the ganged switch arms 37, 37′ in a selected position, depressing the write switch 72 for a period sufficient to pass a coincidence pulse to flip-flop 68 and after one revolution moving the ganged switch arms 37, 37′ to the next position and repeating the operation.

Thus, it is apparent that there is provided by this invention a method and apparatus which successfully achieve the various objects and advantages herein set forth.

Modification of this invention not described herein will become apparent to those of ordinary skill in the art after reading this disclosure. Therefore, it is intended that the matter contained in the foregoing description and the accompanying drawing be interpreted as illustrative and not limitative, the scope of the invention being defined in the appended claims.

What is claimed is:

1. Apparatus for transferring prerecorded data signals from a first cyclic storage medium to a second such medium such that all of the transferred data signals are accurately synchronized and each such signal is recorded in only one revolution of the second medium, comprising said first and second mediums, said first medium having at least one data signal prerecorded thereon, said second medium having a signal means prerecorded thereon for indicating each period of revolution thereof, adjustable drive means coupled to both of said mediums for varying the relative rotational speed thereof, means for reading said data signal out of said first medium, means for determining when the period of said read-out data signal is synchronized to said period of revolution as said drive means is adjusted, and means for transferring said synchronized read-out data signal to said second medium in one of said revolution periods, whereby the readback of the transferred data signal begins at substantially the same time as the readback of any other transferred data signal and is complete in one period of revolution.

2. Apparatus for accurately transferring prerecorded data from a reference drum to a recipient drum in only one revolution even though the rotational speeds of the drums may differ, comprising said reference and recipient drums, drive means to vary the relative rotational speed of the said drums, said reference drum having at least one data track with said prerecorded data being thereon, master and rough mark pulses being on the said reference and recipient drums respectively, with each appearing once per revolution of their respective drums, said master mark pulse having a fixed relationship to the prerecorded data on said reference drum, said rough mark pulse being located at any point around the periphery of said recipient drum, said recipient drum having at least one storage track, means for reading out the data from said data track, means for determining when the said master and rough mark pulses become coincident as the relative speed of the said drums in varied, and means producing an output once per revolution upon said coincidence for enabling the read-out data to be transferred from the reference drum to the recipient drum in only one revolution thereof.

3. Apparatus for transferring prerecorded data from a reference drum to a recipient drum such that the transferred data is accurately synchronized and is recorded in only one drum revolution, which comprises said reference and recipient drums, said reference drum having at least one prerecorded data track and a first signal means having a fixed relation to the data stored on said data track for producing an output once for each revolution of said reference drum, said recipient drum having at least one storage track and a second signal means for producing an output once for each revolution of said recipient drum, adjustable drive means coupled to both said drums for varying the relative rotational speed thereof, first circuit means for reading out the data from said reference drum and for transferring said data to said recipient drum when said first circuit means is enabled, second circuit means for determining when said first and second signal means outputs become coincident as the said drive means is adjusted and for producing an output once per revolution upon said coincidence, and third circuit means for producing an output for enabling the said first circuit means during the period between two successive coincidence outputs from said second circuit means where said period substantially equals one revolution of said recipient drum, whereby the data from one trace of the reference drum is transferred to the recipient drum in only one revolution thereof and is recorded such that the readback signal thereof is accurately synchronized with respect to the readback signal of any other transferred data.

4. Apparatus as in claim 3 wherein said first circuit means includes a first means coupled to readback the data from said data track, a second means to record said data onto said storage track, and a third means coupled to receive as one input thereto a signal representing said readout data and as a second enabling input thereto the output from said third circuit means and passing said one input through to said second means when said enabling input is present, whereby said data can only be transferred to said recipient drum when said third means is enabled by an output from said third circuit means.

5. Apparatus in claim 4 wherein said reference drum has a plurality of prerecorded data tracks, said recipient drum has a plurality of storage tracks, and wherein said first circuit means includes a plurality of each of said tracks and further includes switch means arranged to couple the said one input and the output of said third means between a selected pair of the said first and second means respectively, whereby data from a selected data track can be transferred only to one selected storage track.

6. Apparatus as in claim 5 wherein said first signal means on said reference drum includes a master mark pulse recorded on a second track of said reference drum where said master mark pulse has a fixed relation to the data stored on said data track and means to readback said master mark pulse, and wherein said second signal means on said recipient drum includes a rough mark pulse recorded at any position on a second track of said recipient drum and means to readback said rough mark pulse.

7. Apparatus as in claim 6 wherein said second circuit means includes a first indicating means and a second means both of which receive as one input the said readout of said master mark pulse and each of which also receives as a second input a signal which effectively is the said rough mark pulse, said indicating means functioning to determine when coincidence of said master and rough mark pulses is achieved as the said drive means is adjusted, and said second means of said second circuit means producing said coincidence output once per revolution as long as said mark pulse remain coincident.

8. Apparatus as in claim 7 wherein said first indicating means of said second circuit means is a dual trace oscilloscope which displays the said master mark pulse on one trace and the said effective rough mark pulse on the other trace for indicating coincidence of the said master and rough mark pulses as their oscilloscope traces move into alignment as the said drive means is adjusted.

9. Apparatus as in claim 8 wherein said third circuit means includes a switch means and a bistable circuit means, said bistable means normally being in one of its states and producing no output, said switch means being arranged to be closed just long enough to couple one of said coincidence outputs as an input to said bistable means, said one coincidence output causing said bistable means to switch to its other state producing said output for enabling the said third means of said first circuit means, said third circuit means further including an additional means arranged to receive only the next subsequent one of the coincidence output following said one output and producing at that time an output which causes said bistable means to revert to its said one state which in turn causes both said additional means and said third means of said first circuit means to be disabled, whereby transfer of data from the reference drum to the recipient drum can only be accomplished when the master and rough mark pulses on said respective drums are in coincidence and then only for one revolution between two successive ones of the resultant coincidence outputs.

References Cited in the file of this patent

UNITED STATES PATENTS 2,721,990 McNaney ---------- Oct. 25, 1955
2,795,287 Sharpe ---------- June 11, 1957